United States Patent
Kretschmer et al.

(10) Patent No.: US 9,494,205 B2
(45) Date of Patent: Nov. 15, 2016

(54) BACKSTOPPING CLUTCH WITH TORQUE TRANSMISSION THROUGH RADIAL SURFACE OF OUTER RACE

(71) Applicant: Stieber GmbH, Heidelberg (DE)

(72) Inventors: Torsten Kretschmer, Muehlhausen (DE); Frank Villwock, Zuzenhausen (DE)

(73) Assignee: Stieber GmbH, Heidelberg (DE)

( * ) Notice: Subject to any disclaimer, the term of this patent is extended or adjusted under 35 U.S.C. 154(b) by 147 days.

(21) Appl. No.: 14/423,720

(22) PCT Filed: Oct. 8, 2012

(86) PCT No.: PCT/US2012/059162
§ 371 (c)(1),
(2) Date: Feb. 25, 2015

(87) PCT Pub. No.: WO2014/058410
PCT Pub. Date: Apr. 17, 2014

(65) Prior Publication Data
US 2015/0219173 A1 Aug. 6, 2015

(51) Int. Cl.
*F16D 43/02* (2006.01)
*F16D 41/06* (2006.01)
(Continued)

(52) U.S. Cl.
CPC .......... *F16D 67/02* (2013.01); *F16D 41/06* (2013.01); *F16D 55/38* (2013.01); *F16D 59/00* (2013.01); *F16D 2127/004* (2013.01)

(58) Field of Classification Search
CPC .......... F16D 41/06; F16D 59/00; F16D 67/02; F16D 55/38
See application file for complete search history.

(56) References Cited

U.S. PATENT DOCUMENTS

| 1,892,940 A | 1/1933 | Erdahl |
| 2,408,179 A | 9/1946 | Schuetz et al. |

(Continued)

FOREIGN PATENT DOCUMENTS

| CN | 102230495 A | 11/2011 |
| EP | 0978473 A1 | 2/2002 |
| JP | 60-030851 | 2/1985 |

OTHER PUBLICATIONS

International Search Report issued in International Application No. PCT/US2012/059162 (Sep. 9, 2013).

(Continued)

*Primary Examiner* — Ramya Burgess
*Assistant Examiner* — Lillian Nguyen
(74) *Attorney, Agent, or Firm* — Reising Ethington P.C.

(57) ABSTRACT

A backstopping clutch is provided having improved torque transmission. The clutch includes a housing, an inner race disposed within the housing and configured for coupling to a driven member for rotation about a rotational axis and an outer race disposed with the housing radially outwardly of the inner race. A plurality of torque transmission members are disposed between the inner and outer races such that the inner race is freely rotatable relative to the outer race in a first rotational direction, but the torque transmission members engage the inner and outer races and inhibit rotation of the inner race relative to the outer race in a second rotational direction. Friction discs are coupled to a radially inner surface of the housing and a radially outer surface of the outer race and configured to engage one another to transmit a braking torque.

11 Claims, 3 Drawing Sheets

(51) Int. Cl.
*F16D 67/02* (2006.01)
*F16D 55/38* (2006.01)
*F16D 59/00* (2006.01)
F16D 127/00 (2012.01)

(56) References Cited

U.S. PATENT DOCUMENTS

| | | | |
|---|---|---|---|
| 4,023,654 A | 5/1977 | Winzeler | |
| 4,176,733 A * | 12/1979 | Twickler | B64C 13/28 188/134 |
| 4,753,330 A | 6/1988 | Ohzono et al. | |
| 5,429,218 A * | 7/1995 | Itoh | B60K 17/26 188/134 |
| 5,429,219 A * | 7/1995 | Itoh | B60K 17/26 188/134 |
| 6,688,442 B2 | 2/2004 | Nojiri et al. | |
| 8,087,501 B2 | 1/2012 | Bartos et al. | |
| 2002/0125097 A1 | 9/2002 | Ochab et al. | |
| 2004/0079605 A1 | 4/2004 | Itoh et al. | |
| 2009/0277738 A1 | 11/2009 | Papania et al. | |

OTHER PUBLICATIONS

Written Opinion issued in International Application No. PCT/US2012/059162 (Sep. 9, 2013).
English Language Abstract of Japanese Publication No. 60-030851.

\* cited by examiner

BACKSTOPPING CLUTCH WITH TORQUE TRANSMISSION THROUGH RADIAL SURFACE OF OUTER RACE

BACKGROUND OF THE INVENTION a. Field of the Invention

This invention relates to backstopping clutches. In particular, the instant invention relates to a backstopping clutch in which a braking torque is transmitted through a radial surface of the outer race to permit improved torque transmission while also reducing the size of the clutch.

b. Background Art

In many motor driven systems, it is desirable to prevent or limit movement of system components in one direction. For example, mining operations typically use inclined conveyors to convey material to a surface location or other outlet. It is desirable to prevent or limit reverse movement of the conveyor in the event of a loss of power or a failure of a driveline component such as a motor, gearbox or coupling in order to prevent material from moving backwards on the conveyor and causing damage to the system and significant injuries to personnel operating the system.

Backstopping clutches are frequently used to prevent reverse rotation of rotating system components. A conventional backstopping clutch 10 as shown in FIG. 1 includes an inner race 12 that is mounted to a shaft (not shown), driven by a motor or similar device, for rotation with the shaft about a rotational axis 14. An outer race 16 is disposed radially outward of the inner race 12 and is fixed against rotation. A plurality of torque transmission members 18 such as rollers or sprags are disposed radially between the inner and outer races 12, 16. Races 12, 16 and/or members 18 are shaped such that when the shaft and inner race 12 are driven by the motor in one rotational direction, members 18 assume a first position permitting relative rotation of the inner and outer races 12, 16. When the inner race 12 is driven in the opposite rotational direction (e.g. by the force of the load of material upon failure of the motor), members 18 assume a second position and forcefully engage the inner and outer races 12, 16 and prevent the inner race 12 and driven shaft from rotating relative to the fixed outer race 16.

In the clutch 10 shown in FIGS. 1, spring loaded friction discs 20, 22 are disposed on either axial end of outer race 16 between race 16 and the surrounding structure. Braking torque is therefore transmitted through the axial ends of outer race 16. The clutch 10 provides a relatively low-maintenance and simple design, but has several disadvantages. The clutch 10 transmits relatively low braking torque despite the use of a relatively large size clutch. The clutch 10 also has relatively low heat conductivity which limits friction generated through the discs 20, 22. Wear on the discs 20, 22 (as well as thermal expansion and manufacturing tolerances) lead to variable axial loading on the outer race 16 and relatively large changes in the coefficient of friction. The outer race 16 must also be centered using sensitive plane bearings or relatively large roller bearings. The design of clutch 10 also makes it difficult to adapt to various drive trains. Finally, the relatively high heat generated by the clutch limits the time that the clutch can slip which lessens its ability to dampen longitudinal vibrations along a conveyor resulting from a sudden failure of the motor or related components.

The inventor herein has recognized a need for a backstopping clutch that will minimize and/or eliminate one or more of the above-identified deficiencies.

BRIEF SUMMARY OF THE INVENTION

The present invention relates to a backstopping clutch. In particular, the present invention relates to a backstopping clutch in which torque is transmitted through a radial surface of the outer race to improve torque transmission while permitting the use of a smaller clutch.

A backstopping clutch in accordance with one embodiment of the invention includes a housing, an inner race disposed within the housing and configured for coupling to a driven member for rotation about a rotational axis, and an outer race disposed with the housing radially outwardly of the inner race. A plurality of torque transmission members are disposed between the inner and outer races. The inner race is freely rotatable relative to the outer race in a first rotational direction. The torque transmission members are configured to engage the inner and outer races and inhibit rotation of the inner race relative to the outer race in a second rotational direction. A first friction disc is coupled to a radially inner surface of the housing. A second friction disc is coupled to a radially outer surface of the outer race and configured to engage the first friction disc.

A backstopping clutch in accordance with the present invention may offer several advantages. The inventive clutch is able to transmit a relatively large braking torque despite a relatively small size. The inventive clutch also has a relatively high level of heat conductivity for increased friction. Axial loading on the outer race is independent of wear on the friction discs, temperature expansion and manufacturing tolerances. The coefficient of friction is also relatively stable over the life of the clutch and can be adjusted to fit the needs of the operator. The outer race can be centered using caged roller bearings that are more robust and/or smaller than bearings in conventional clutches. The design of clutch is also easily adaptable to various drive trains. Finally, the reduced heat generated by the clutch as compared to conventional clutches permits increased slip times thereby enabling improved dampening of vibrations in conveyors and similar systems resulting from sudden failures of the motor or other drive components. Slip times are also subject to greater control through the use of different materials in the friction discs and lubricants as opposed to control through spring force as in conventional clutches.

The foregoing and other aspects, features, details, utilities, and advantages of the invention will be apparent from reading the following detailed description and claims, and from reviewing the accompanying drawings illustrating features of this invention by way of example.

DETAILED DESCRIPTION OF THE INVENTION

Figure 1:
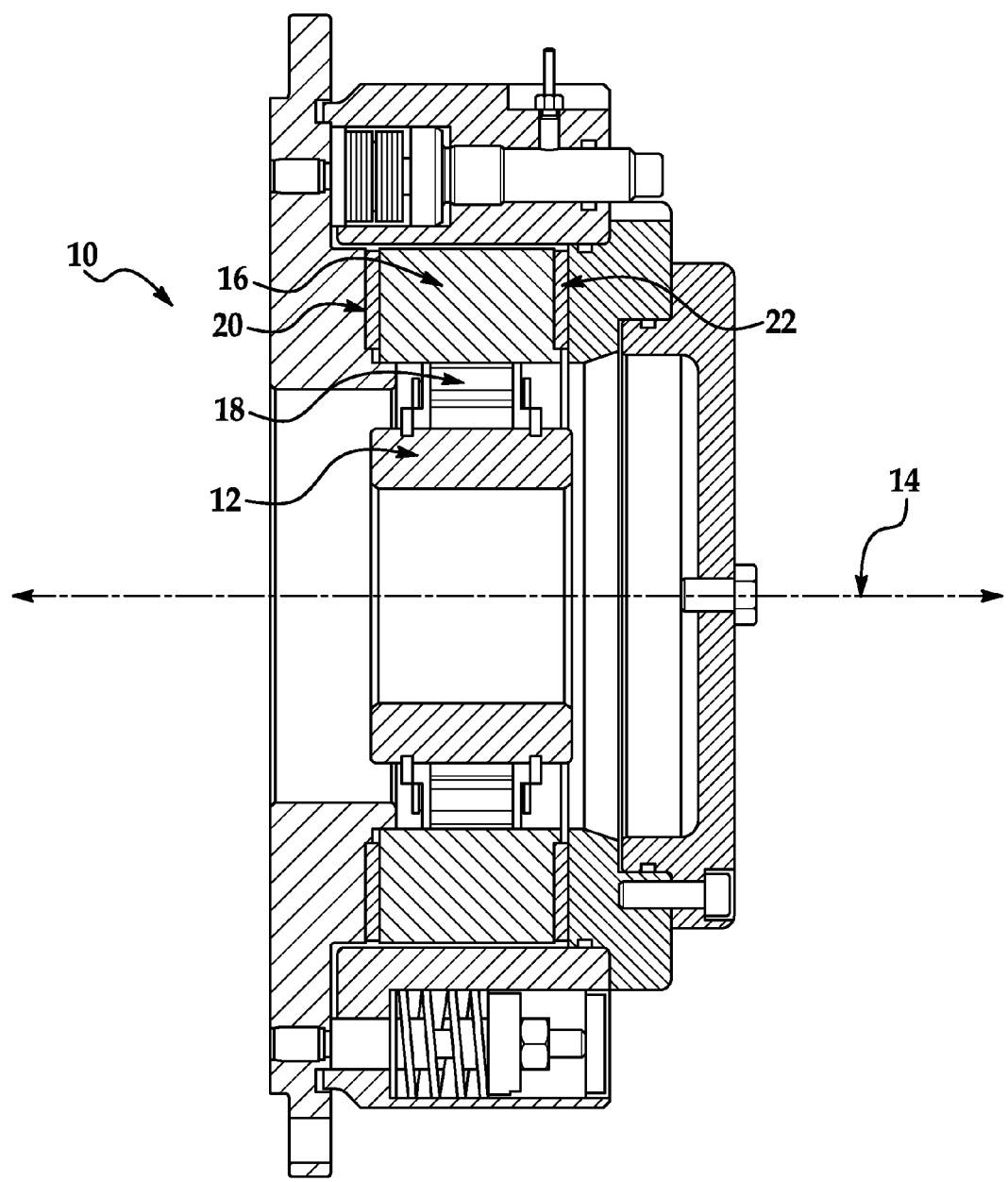
FIG. 1 is a cross-sectional view of a prior art backstopping clutch.
Figure 2:
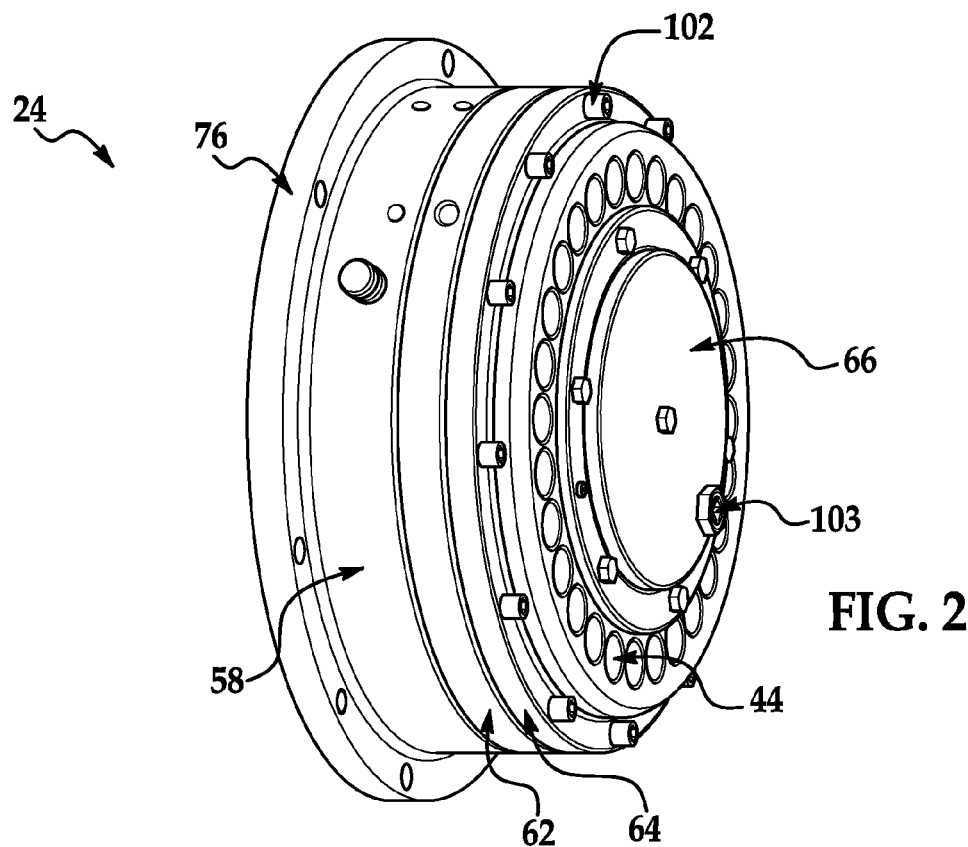
FIG. 2 is a perspective view of a backstopping clutch in accordance with the present invention.
Figure 3:
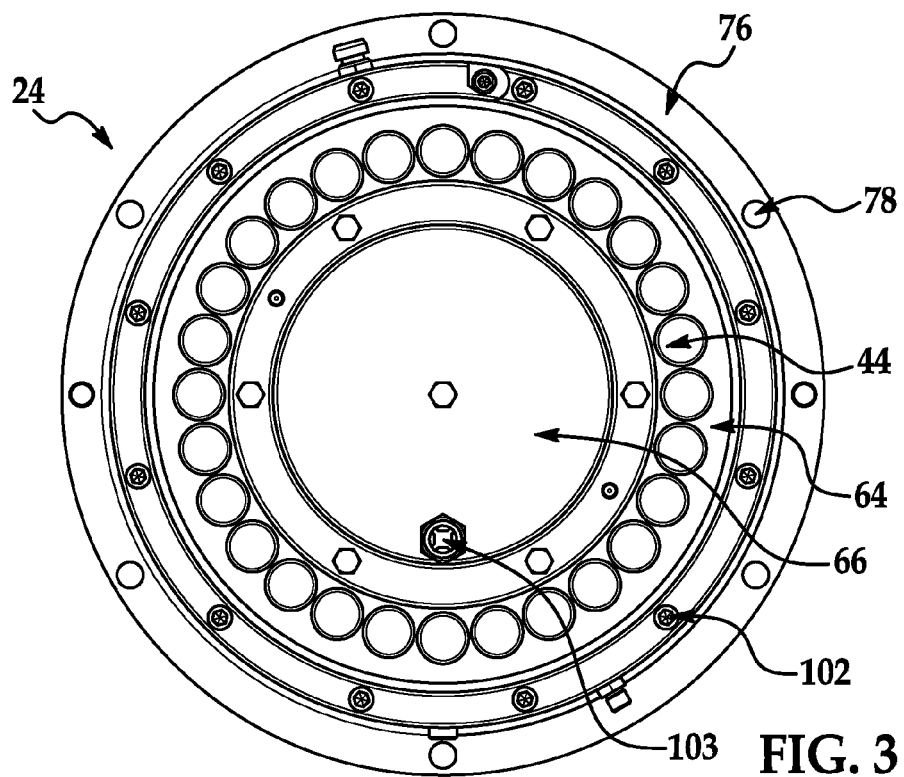
FIG. 3 is a plan view of the clutch of FIG. 2.
Figure 4:
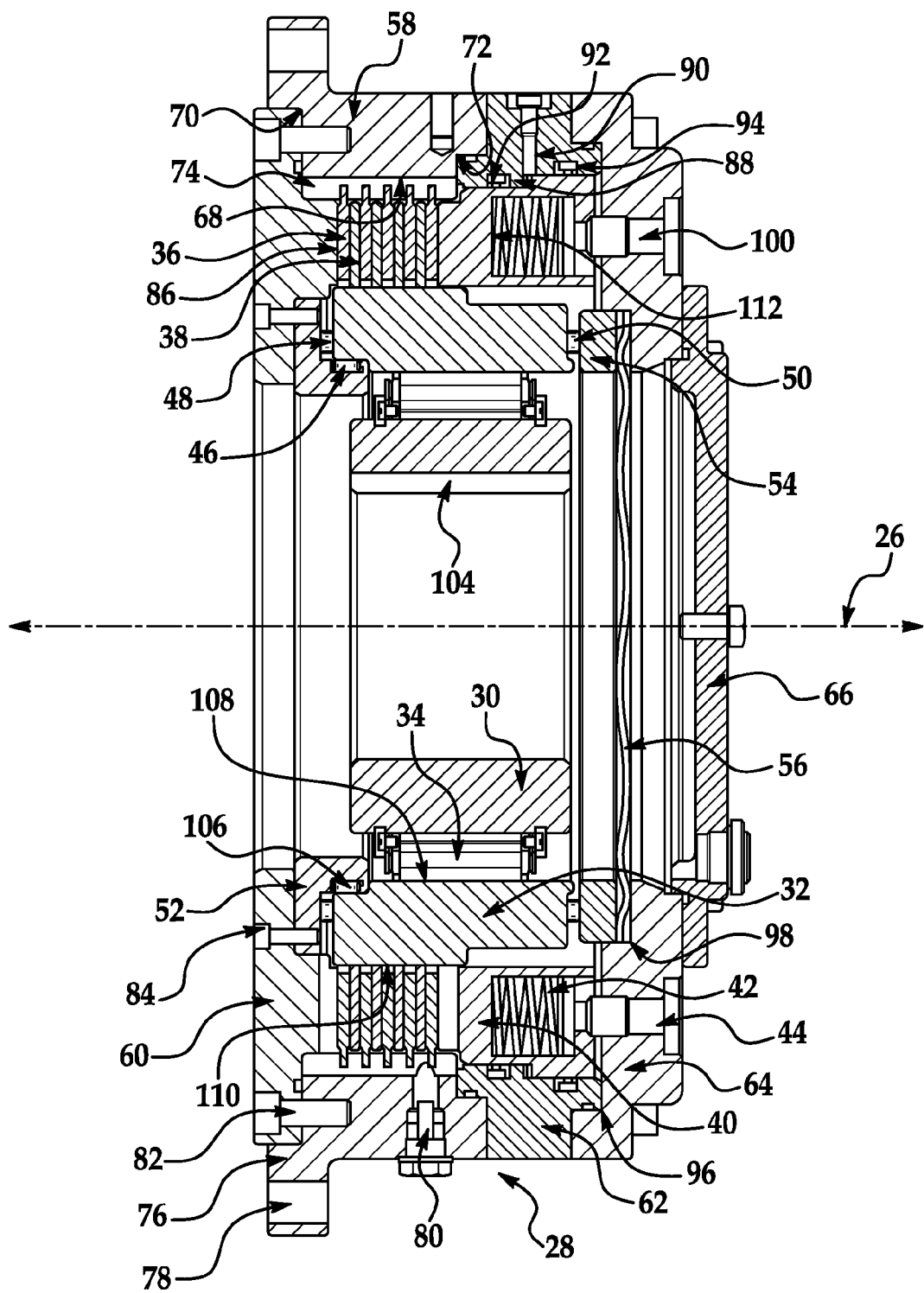
FIG. 4 is a cross-sectional view of the clutch of FIG. 2.

Referring now to the drawings wherein like reference numerals are used to identify identical components in the various views, FIGS. 2-4 illustrate a backstopping clutch 24 in accordance with one embodiment of the invention. Clutch 24 is provided to inhibit reverse rotation of a driven shaft (not shown) about a rotational axis 26 and damping of longitudinal vibrations in the drive train due to slipping of the brake. Clutch 24 may include a housing 28, inner race 30, outer race 32, torque transmission members 34, friction discs 36, 38, means, such as piston 40 and springs 42, for urging discs 36, 38, into engagement, means, such as adjusters 44, for adjusting the tension on springs 42 and, therefore, the friction force in clutch 24, bearings 46, 48, 50, bearing rings 52, 54, and spring 56.

Housing 28 provides a path for reacting the torque from engagement of clutch 24. Housing 28 also provides structural support to the other components of clutch 24 and protects those components from foreign objects and elements. Housing 28 may be made from conventional metals and metal alloys and may include several members 58, 60, 62, 64, 66.

Member 58 of housing 28 is annular in construction. The diameter of a radially inner surface 68 of member 28 varies to define shoulders 70, 72 at either axial end, sized to receive members 60, 62, of housing 28. Surface 68 further defines one or more splines 74 or teeth for a purpose described hereinbelow. Member 58 defines a radially outwardly extending flange 76 at one axial end having a plurality of axially extending bores 78 configured to receive fasteners (not shown) for mounting housing 28 to a fixed or stationary structure. Member 58 may further define a plurality of radially extending lubricant ports 80 through which a lubricant may be provided to the internal components of clutch 24 and drained from clutch 24.

Member 60 provides a centering diameter (an outer diameter) for mounting clutch 24 to surrounding structure. Member 60 is annular in construction and is disposed at one axial end of clutch 24. Member 60 is configured to engage shoulder 70 in member 58. Member 60 may be coupled to member 58 using fasteners extending through bores 82 that are aligned with corresponding bores in member 58. Member 60 may further be coupled to bearing ring 52 using fasteners extending through bores 84 that are aligned with corresponding bores in ring 52. Member 60 defines a reaction surface 86 against which friction discs 36, 38 may be compressed.

Member 62 is disposed between members 58, 64. Member 62 is annular in construction and is configured to engage shoulder 72 in member 58 and a corresponding shoulder in member 64. The diameter of a radially inner surface of member 62 varies to define a shoulder 88 configured to limit movement of piston 40 in one axial direction (to the left in FIG. 4). Member 62 defines a radially extending fluid port 90 terminating at shoulder 88 and may define grooves in a radially inner surface on either side of port 90 configured to receive fluid seals 92, 94. Fluid (e.g. hydraulic fluid) can be provided through port 90 and fluid pressure thereby applied to piston 40 against the force of spring 42 to release the brake. Similarly, member 62 may define grooves in a radially outer surface proximate either axial end of member 62 configured to receive fluid seals.

Member 64 of housing 28 is also annular in construction. The diameter of a radially inner surface of member 64 varies to define shoulders 96, 98, configured to receive member 62 and bearing ring 54 and spring 56. Member 64 may further define a plurality of axially extending bores 100 corresponding to the number of springs 42. Bores 100 are aligned with springs 42 and configured to receive adjusters 44. Referring to FIG. 3, member 64 may be coupled to member 62 using conventional fasteners 102 such as screws, bolts or rivets.

Member 66 of housing 28 encloses one axial end of clutch 24. Member 66 may be coupled to member 64 using conventional fasteners such as screws, bolts, or rivets.

Member 66 may include a lubricant gauge 103 for determining lubricant levels and condition. Gauge 103 may include a transparent material such as glass to allow visual inspection of fluid levels and condition.

Inner race 30 provides a means for coupling clutch 24 to the driven shaft. Race 30 is annular and sized to receive the driven shaft. Race 30 may define a key or keyway 104 in a radially inner surface configured to engage a mating keyway or key in the driven shaft to align race 30 with the driven shaft and rotatably couple race 30 to the shaft.

Outer race 32 transmits a braking torque to inner race 30 through torque transmission members 34 when inner race 30 rotates in one of two directions of rotation. Outer race 32 is disposed radially outwardly of inner race 30 and members 34. A diameter of a radially inner surface of race 32 varies to define a bearing surface 106 and a torque transmission surface 108. A radially outer surface 110 of race 32 defines one or more splines (not shown) or teeth for a purpose described hereinbelow.

Torque transmission members 34 provide a means for coupling inner and outer races 30, 32 and are conventional in the art. Members 34 are disposed radially between inner race 30 and outer race 32 and may be retained in position by a cage or may be loose. Members 34 may also be biased by springs (not shown) into engagement with or disengagement from inner or outer race 30, 32. The radially outer surface of inner race 30 or the radially inner surface 108 of outer race 32 may define cam surfaces and/or transmission members 34 may be shaped such that members 34 assume a first position when inner race 30 rotates in one rotational direction to permit rotation of inner race 30 relative to outer race 32 (i.e. freewheeling) and members 34 assume a second position when inner race 30 attempts to rotate in the opposite rotational direction to inhibit inner race 30 from rotating relative to outer race 32.

Friction discs 36, 38 are provided to transmit a braking torque from housing 28 to outer race 32 and further to inner race 30 through members 34 when inner race 30 is driven in one rotational direction. Discs 36, 38 are conventional in the art. Discs 36, 38 may be made from metals and metal alloys, semi-metal materials (compounds of metal and non-metals), organic materials and/or sintered materials. Discs 36 define a plurality of splines or teeth on a radially outer surface configured to receive and engage splines 74 on member 58 of housing 28. Similarly, discs 38 define a plurality of splines or teeth on a radially inner surface configured to receive an engage splines on the radially outer surface 110 of race 32. Discs 36, 38 alternate in an axial direction or are interleaved. One or more of discs 36, 38 may be aligned radially and disposed radially outwardly of members 34.

Piston 40 is provided to urge discs 36, 38, towards surface 86 of member 60 of housing 28 and into engagement with one another. Piston 40 is annular in construction. Piston 40 is disposed radially between outer race 32 and members 62, 64 of housing 28 and is axially aligned with discs 36, 38. A diameter of a radially outer surface of piston 40 varies to define a shoulder configured to engage shoulder 88 in member 62 to limit axial movement of piston 40 in one direction (to the left in FIG. 4) and to define a surface against which hydraulic pressure can be applied through port 90 to release the brake. Piston 40 defines a plurality of closed bores 112 configured to receive springs 42 and adjusters 44 therein.

Springs 42 are provided to bias piston 40 in one axial direction (to the left in FIG. 4) to urge discs 36, 38 into engagement. Springs 42 may comprise conventional coil or wave springs and are sized to be received within bores 112 in piston 40. Although the illustrated embodiment employs springs 42 to control movement of piston 40, it should be understood that piston 40 could alternatively be controlled using fluid pressure.

Adjusters 44 provide a means for adjusting the tension in springs 42 and, therefore, the friction force in clutch 24. Adjusters 44 may comprise threaded bolts that extend through bores 100 in member 64 of housing 28 and engage a corresponding spring 42. Movement of adjusters 44 compresses or relaxes a corresponding spring 42 to vary the force applied by the spring 42 against piston 40.

Bearings 46, 48, 50 are provided to center outer race 32 in an axial and radial direction. In accordance with one aspect of the invention, bearings 46, 48, 50 may comprise caged roller bearings which are more robust, smaller and require less maintenance than conventional plain bearings or rollers. Bearings 46 are disposed radially between bearing surface 106 on outer race 32 and a corresponding bearing surface on bearing ring 52. Bearings 46 may be radially aligned with one or more of friction discs 36, 38. Bearings 48 are disposed axially between a bearing surface at one axial end of race 32 and a corresponding bearing surface on bearing ring 52. Similarly, bearings 50 are disposed axially between a bearing surface at the opposite axial end of race 32 and a corresponding bearing surface on bearing ring 54.

Bearing rings 52, 54 provide bearing surfaces opposing corresponding surfaces in outer race 32. Rings 52, 54 are annular in construction. Ring 52 may be coupled to member 60 of housing 28 using conventional fasteners as described hereinabove. Ring 54 may be constrained against radial movement by member 64 of housing 28, but free to move axially along axis 26.

Spring 56 is provided to apply a load to bearings 48, 50 through bearing ring 54. Spring 56 is conventional in the art any may comprise a coil or wave spring. Spring 56 is disposed axially between bearing ring 54 and member 64 of housing 28 and is constrained against radial movement by member 64.

A clutch 24 in accordance with the present invention provides several advantages relative to conventional backstopping clutches. Locating the friction discs 36, 38, on a radial surface 110 of outer race 32 enables the use of more friction discs 36, 38 than conventional clutches and within a relatively compact area. As a result, the inventive clutch 24 is able to transmit a relatively large braking torque despite a relatively small size. The inventive clutch 24 also has a relatively high level of heat conductivity for increased friction. Further, axial loading on the outer race 32 is independent of wear on the friction discs 36, 38, temperature expansion and manufacturing tolerances. The coefficient of friction is also relatively stable over the life of the clutch 24 and can be adjusted to fit the needs of the operator. The outer race 32 can be centered using caged roller bearings 46, 48, 50 that are more robust and/or smaller than bearings in conventional clutches. The design of clutch 24 is also easily adaptable to various drive trains. Finally, the reduced heat generated by the clutch 24 as compared to conventional clutches permits increased slip times thereby enabling improved dampening of vibrations in conveyors and similar systems resulting from sudden failures of the motor or other drive components While the invention has been shown and described with reference to one or more particular embodiments thereof, it will be understood by those of skill in the art that various changes and modifications can be made without departing from the spirit and scope of the invention.

What is claimed is:

1. A backstopping clutch, comprising:
   a housing;
   an inner race disposed within said housing and configured for coupling to a driven member for rotation about a rotational axis;
   an outer race disposed with said housing radially outwardly of said inner race;
   a plurality of torque transmission members disposed between said inner and outer races, said inner race freely rotatable relative to said outer race in a first rotational direction, said torque transmission members configured to engage said inner and outer races and inhibit rotation of said inner race relative to said outer race in a second rotational direction;
   a first friction disc coupled to a radially inner surface of said housing;
   a second friction disc coupled to a radially outer surface of said outer race and configured to engage said first friction disc
   a first plurality of roller bearings engaging a first axial end of said outer race; and,
   a second plurality of roller bearings engaging one of a radially inner surface and said radially outer surface of said outer race.

2. The backstopping clutch of claim 1, further comprising:
   a third friction disc coupled to said radially outer surface of said outer race and disposed on an opposite side of said first friction disc relative to said second friction disc.

3. The backstopping clutch of claim 1, further comprising:
   a third friction disc coupled to said radially inner surface of said housing and disposed on an opposite side of said second friction disc relative to said first friction disc.

4. The backstopping clutch of claim 3, further comprising:
   a fourth friction disc coupled to said radially outer surface of said outer race and disposed on an opposite side of said third friction disc relative to said second friction disc.

5. The backstopping clutch of claim 1, further comprising means for urging said first and second friction discs into engagement with one another.

6. The backstopping clutch of claim 5 wherein said urging means comprises:
   a piston configured to engage one of said first and second friction discs; and,
   a spring configured to urge said piston in a first axial direction towards said one friction disc.

7. The backstopping clutch of claim 6, further comprising means for adjusting a force applied by said spring to said piston.

8. The backstopping clutch of claim 6 wherein said piston engages said one friction disc at a location disposed radially outwardly of said plurality of torque transmission members.

9. The backstopping clutch of claim 1, further comprising a third plurality of roller bearings engaging a second axial end of said outer race.

10. The backstopping clutch of claim 1 wherein said first friction disc is axially movable relative to said radially inner surface of said housing and said second friction disc is axially movable relative to said radially outer surface of said outer race.

11. The backstopping clutch of claim 1 wherein at least one of said first and second friction discs is disposed radially outwardly of said plurality of torque transmission members.

* * * * *